United States Patent [19]

Iddon

[11] 4,131,368
[45] Dec. 26, 1978

[54] SCROLLS FOR EXTRUDING MACHINES

[75] Inventor: Michael I. Iddon, Leyland, England

[73] Assignee: Iddon Brothers Limited, Lancaster, England

[21] Appl. No.: 852,869

[22] Filed: Nov. 18, 1977

Related U.S. Application Data

[63] Continuation-in-part of Ser. No. 675,408, Apr. 9, 1976, abandoned.

[51] Int. Cl.² ............................................. B29B 1/10
[52] U.S. Cl. ...................................... 366/81; 366/318
[58] Field of Search ............... 198/657, 661, 662, 663, 198/669; 366/79, 81–84, 88–90, 318–324; 425/113, 130, 208, 587

[56] References Cited

U.S. PATENT DOCUMENTS

| | | | |
|---|---|---|---|
| 3,570,654 | 3/1971 | Hill | 198/661 |
| 3,633,880 | 1/1972 | Newmark | 366/89 X |
| 3,687,423 | 8/1972 | Koch et al. | 366/81 |
| 3,867,079 | 2/1975 | Kim | 425/208 |
| 3,941,535 | 3/1976 | Street | 425/208 |

Primary Examiner—Leonard D. Christian
Attorney, Agent, or Firm—Norris & Bateman

[57] ABSTRACT

A scroll for extruding machines comprising a single or double start helical flight or rib divided into a plurality of zones one or more of the zones being formed with a plurality of facets formed with a plurality of opposing angled members located around the root diameter of the flight or rib to homogenize and plasticate the mix as it passes along the scroll and an extruding machine incorporating the scroll comprising a liner forming an under wall of a cavitated outer jacket or barrel divided into a plurality of zones within which the scroll rotates means for circulating steam/water through each zone to maintain a predetermined temperature therein, thermo pockets for monitoring the temperatures, and a motor for driving the scroll.

2 Claims, 4 Drawing Figures

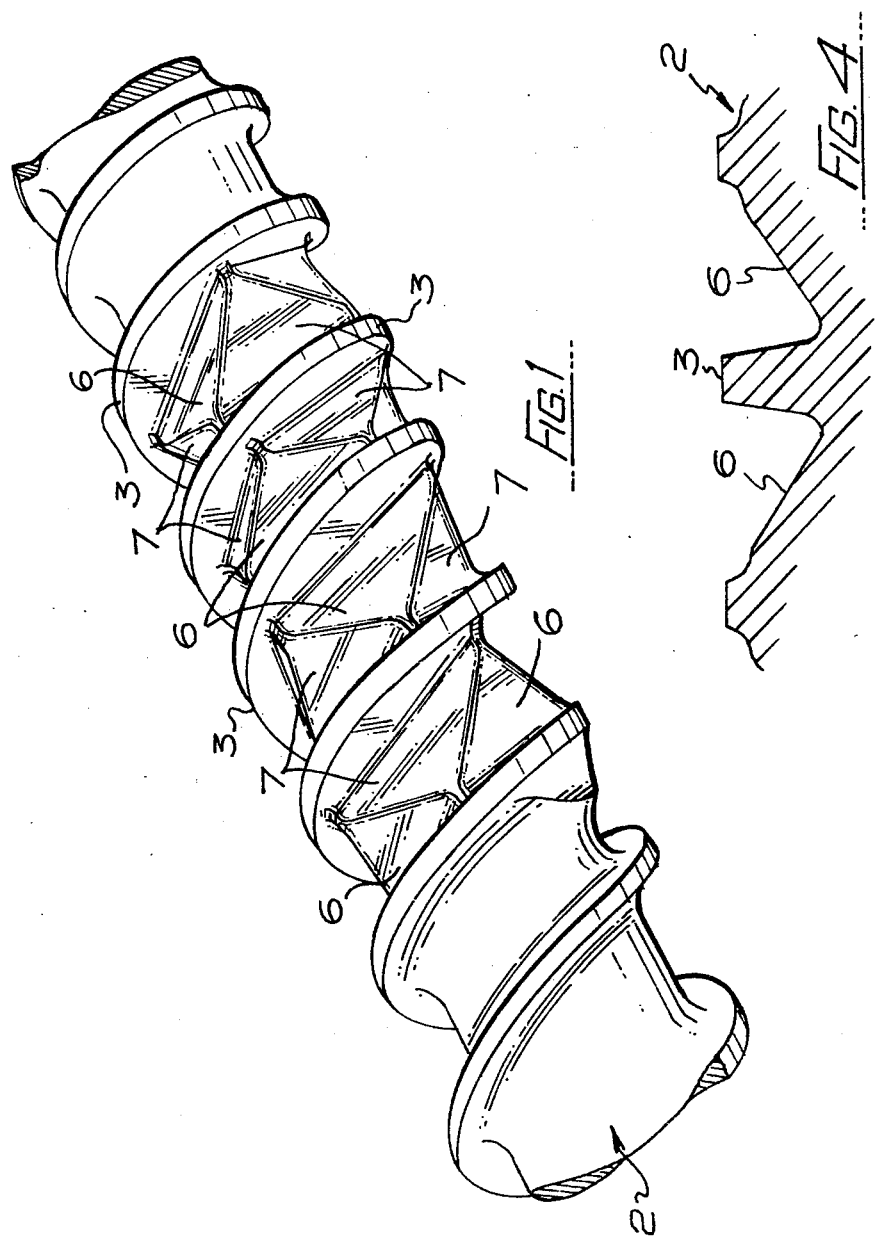

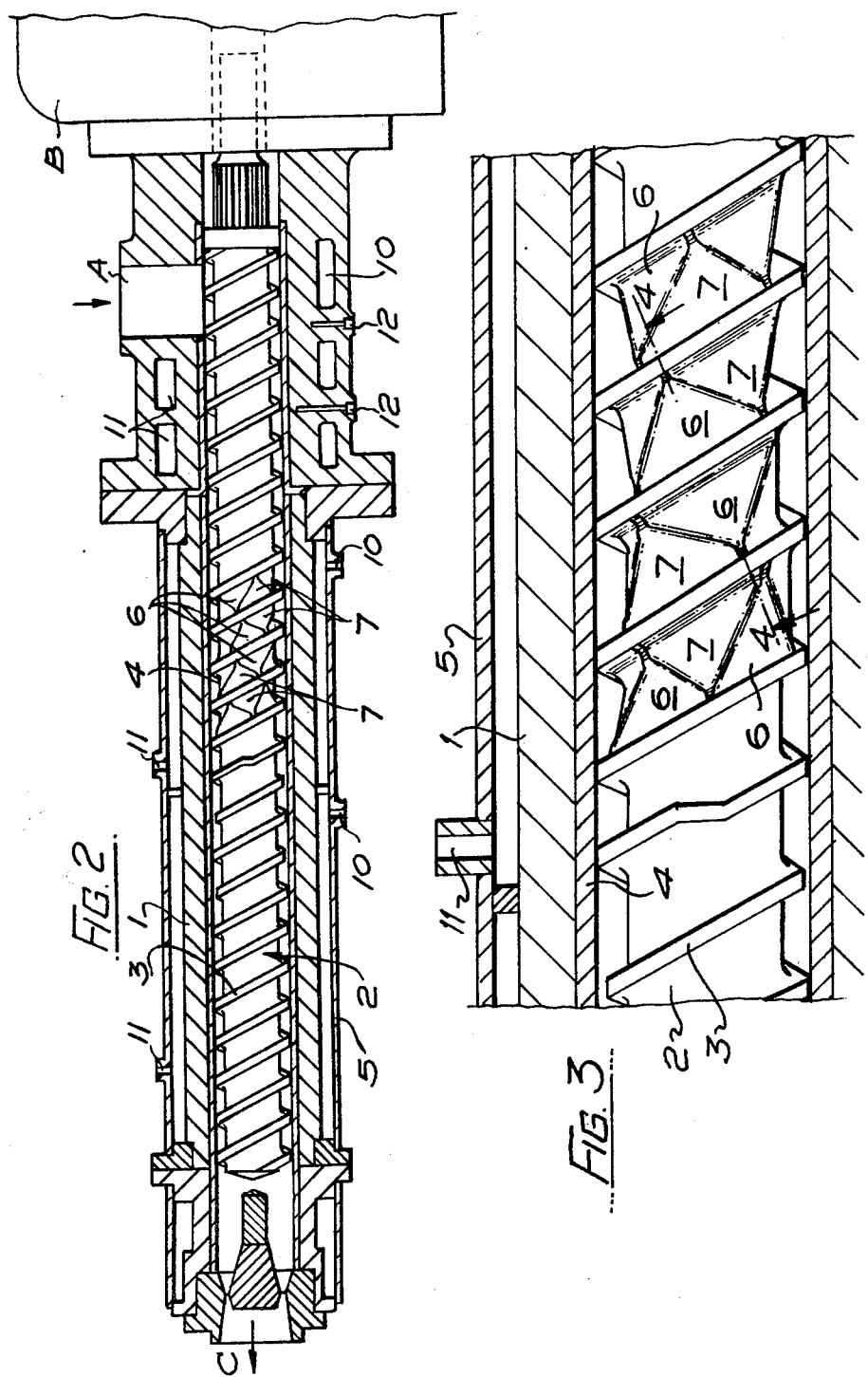

SCROLLS FOR EXTRUDING MACHINES

This is a continuation-in-part of Ser. No. 675,408 filed Apr. 9, 1976 for Improvements in Scrolls for Extruding Machines (now abandoned).

This invention relates to improvements in scrolls for extruding machines for processing natural and synthetic rubber in strip, granular, powder, or any other form, and cross linked materials associated with the rubber and plastic industry, inclusive of rubbers cross linked with plastics, p.v.c. Nitrile.

Some rubber and plastics mixes have a relatively stiff plastic consistency and require very thorough mixing in order to obtain an homogenous extrusion, and it has been proposed to provide a scroll with radial pegs or projections between the turns of the scroll to assist in mixing the material as it passes through the machine, but with some mixes this arrangement will not give the required homogeneity, especially in the case of some powdered materials.

The object of the invention is to simplify the homogenisation and plastication of the mix.

According to the invention a rotatable scroll for an extruding machine comprises a series of helical flights and means in at least one longitudinal zone along the scroll providing a series of facets arranged in pairs between the helix flights, the facets of each pair being alternately angled in an upward and then downward direction relatively to the helix leading or trailing edges, the pairs of facets being repeated along the length of the zone, and disposed around the root diameter of the scroll between successive flights in the zone, each of said facets being inclined inwardly from adjacent the outer periphery of the scroll flight.

The invention will be described with reference to the accompanying drawings:

FIG. 1 is a perspective view of a scroll;
FIG. 2 is a longitudinal section through an extruding machine showing the scroll in position;
FIG. 3 is a similar section enlarged of part of FIG. 2;
FIG. 4 is a section of line 4—4 FIG. 3.

An extruding machine is formed with an extrusion cylinder 1, in which is mounted a rotation scroll 2, by which the mix to be extruded is traversed through the cylinder. Alternatively, two intermeshing scrolls as is commonly used, can be provided with a single or multiple series of mixing zones.

The scroll 2 comprises a single or double start helix or flight 3 profiled from the main body material and rotating in a hardened steel liner 4, into which it is fitted with suitable diammetrical clearance to allow for free rotation, but not large enough to impair its efficiency; this liner 4 forming part of the inner wall of a zoned outer jacket or barrel 5. The cavities 11 allow for any form of temperature control in any horizontal length to conform with the characteristics of the process and scroll design, with special attention being given to their correct location with respect to the mixing zones of the scroll or scrolls incorporating facets.

The construction of the scroll 2 profile is such that at the feed end where the material enters, the single or double helix or flight 3 conveys the material down the cylinder through a series of heating and mixing zones. Temperatures can be controlled and also suitable work performed on the material to help homogenise and plasticate it by the conventional method of increasing the compression ratio of the scroll 2.

After passing through a first zone the mix enters a second zone in which the scroll is profiled and provided with a plurality of the facets 6, 7 arranged in pairs.

The facets 6, 7 on the flight 3 are formed in pairs as a plurality of opposing angled members located around the root diameter of the scroll or scrolls and may be provided in one zone as shown in FIG. 2 or in a series of zones and by virtue of the constantly changing cross section of the flights create a constant kneading action on the material and at the same time induce rolling of the material as it passes along the helical path between the flights and induces sufficient work into the aforesaid material to transfer it into a workable plasticised condition by the time it enters into the die aperture, regardless of the form in which it is fed into the extruder.

In addition to the facets being inclined they are arranged to progress around the helix as shown particularly in FIG. 1.

With a standard type cold feed rubber scroll which relies purely on compressive and not displacement type shear certain polymers do not process satisfactorily due to the fact that only nominal interflowing of the rubber takes place as it passes along the scroll length.

Using the present construction the rubber flowing over the concentric circular surface of the scroll is by means of the flight helix forced over the first facet 6. This facet 6 is angled in an upwards direction from the leading to the trailing helix spires. Directly following this first facet 6 is a second facet 7 which is angled downwards relatively to the leading and trailing helix spires.

The facets are arranged as shown in FIG. 3 and repeated along the mixing zone length or lengths.

The alternating angled facet surfaces 6, 7 cause extensive rubber displacement, turbulence and shear along the mixing zone length or lengths and process around the helix.

What I claim is:

1. A rotatable scroll for an extruding machine comprising a series of helical flights and means in at least one longitudinal zone along the scroll providing a series of facets arranged in pairs between the helix flights, the facets of each pair being alternatively angled in an upward and then downward direction relatively to the helix leading or trailing edges, the pairs of facets being repeated along the length of the zone, and disposed around the root diameter of the scroll between successive flights in the zone, each of said surfaces being inclined inwardly from adjacent the outer periphery of the scroll flight.

2. A rotatable scroll for an extruding machine as in claim 1 in which the adjacent pairs of the angled facets progress around the helix.

* * * * *